Sept. 16, 1969  R. ASHTON ETAL  3,466,854
GROUND SPEED RESPONSIVE VARIABLE DRIVE FOR
CROP HANDLING APPARATUS
Filed May 19, 1966
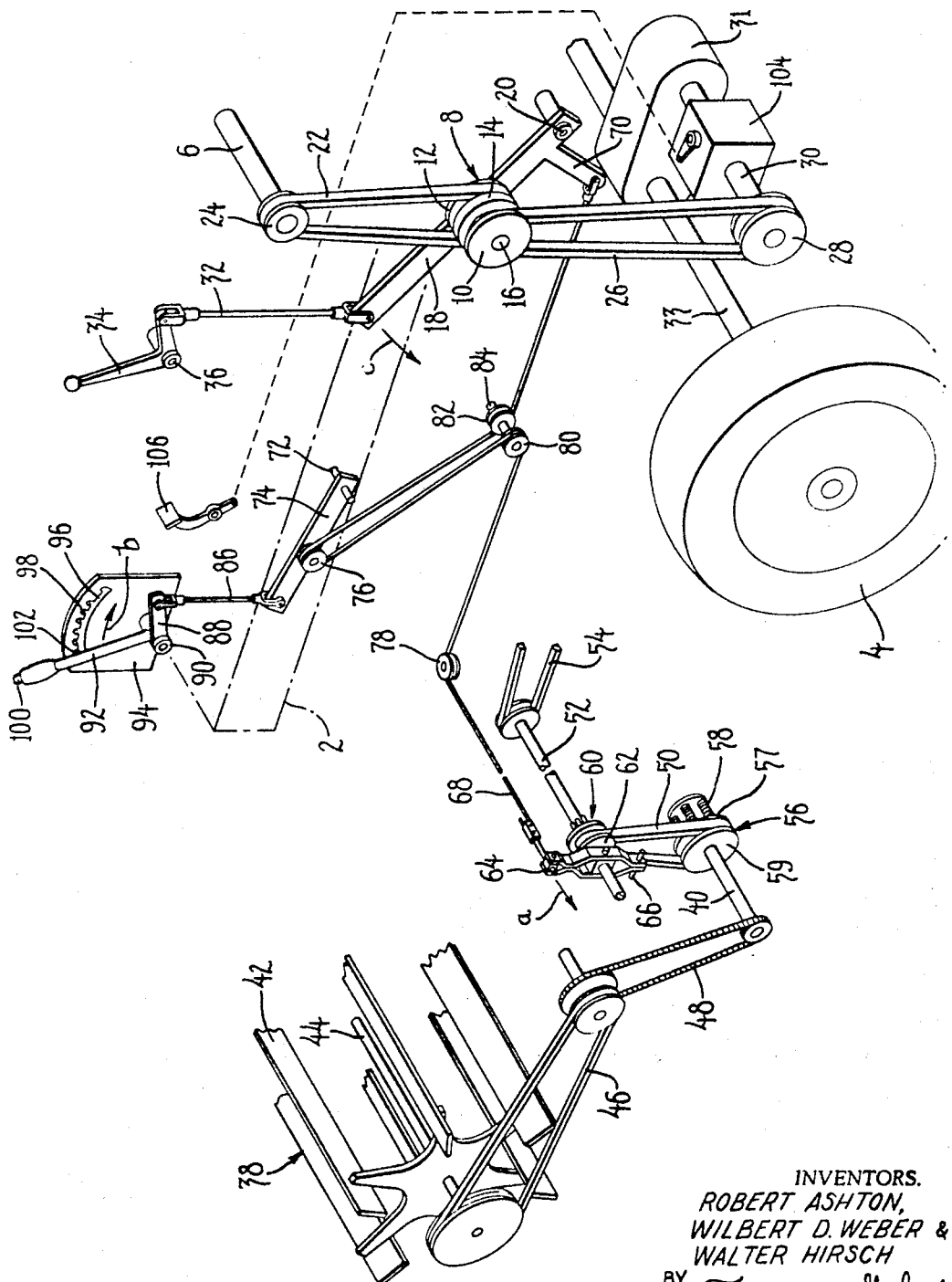
INVENTORS.
ROBERT ASHTON,
WILBERT D. WEBER &
WALTER HIRSCH
BY Tweedale & Gerhardt
ATTORNEYS.

United States Patent Office 3,466,854
Patented Sept. 16, 1969

3,466,854
GROUND SPEED RESPONSIVE VARIABLE DRIVE FOR CROP HANDLING APPARATUS
Robert Ashton, Islington, Ontario, Wilbert D. Weber, Nashville, Ontario, and Walter Hirsch, Don Mills, Ontario, Canada, assignors to Massey-Ferguson Industries Limited, Toronto, Ontario, Canada
Filed May 19, 1966, Ser. No. 551,417
Int. Cl. A01d *41/02*
U.S. Cl. 56—21          10 Claims

ABSTRACT OF THE DISCLOSURE

A combine harvester has a prime mover that is operably connected through a variable speed drive to a crop handling apparatus and through another variable speed drive to a transmission which drives the ground wheels. A hand lever is connected through a linkage to the ground speed variable drive for selective variation thereof and another control lever is provided for the crop handling apparatus. A cable and pulley arrangement interconnects the ground speed control lever through the crop handling control lever to the variable drive to variably drive the crop handling apparatus. Movement of the crop handling control lever will effect an independent change of crop handling speed, while movement of the ground speed lever to change ground speed will effect a proportional change in crop handling speed.

---

This invention relates generally to agricultural machinery and is particularly concerned with a drive and speed control system for the harvesting reel or other crop handling apparatus in machines such as self-propelled combines.

In accordance with the present invention, the speed of the harvesting reel can be initially set by the operator and will thereafter increase or decrease automatically with the ground speed. When the machine stops its forward travel, or is reversed, the reel can continue to run at the speed initially set by the operator. The speed of the reel can be changed by the operator while the combine is moving independently of the ground speed. The reel and drive wheels of the machine are driven independently of each other from the main power plant of the combine through separate variable speed drives. A shifter member on the variable speed drive for the reel is connected by a cable with a speed selector lever, and the cable is further connected with the ground speed control lever associated with the variable speed drive for the traction wheels of the vehicle. The operator can thus determine the speed of the reel by positioning the speed selector lever, and the reel speed will thereafter increase or decrease in response to changes in the position of the ground speed control lever.

In some presently available machines of this type, the harvesting reel or gathering units are driven directly from the transmission differential shaft. The reel speed thus increases, decreases or stops as the ground speed increases or decreases, or the vehicle stops. When turning a corner, the differential action causes a sudden, substantial increase or decrease in the reel speed depending upon the direction of the turn. Usually, in order to change the speed of the harvesting reel relative to the ground speed, different sized sprockets or pulleys must be installed.

However, with the present invention, the speed at which the reel or other crop handling apparatus is driven can be selected by manipulation of a selector lever and will thereafter increase or decrease automatically in response to movement of the ground speed control in a direction to respectively increase or decrease the ground speed, and is unaffected by differential action during turns.

An embodiment of the invention will now be described, by way of example, with reference to the accompanying drawing which schematically illustrates an embodiment of the invention.

In the drawing, reference numeral 2 designates the operator's platform of an agricultural combine or similar vehicle, and reference numeral 4 designates one of the drive wheels of the vehicle. Power is transmitted to the wheel 4 from an output shaft 6 driven by the main power plant through a variable speed transmission designated generally by reference numeral 8. In the illustrated embodiment, the variable speed transmission 8 is in the form of a double, variable diameter pulley having outer plates 10 and 12 interconnected with each other and which float axially along a shaft 16 relative to a common inner plate 14, this type of pulley being fully disclosed in U.S. Patent 3,213,857 to Robert A. Ashton and Wilbert D. Wiber, dated Oct. 26, 1965. As plate 14 moves axially relative to the outer plates 10 and 12, the effective diameters of the pulleys defined on either side of the inner plate 14 increase and decrease accordingly.

The double pulley assembly 8 is connected with the output shaft 6 by means of a belt 22 engaged between plates 12 and 14 of the double pulley and a pulley 24 on the end of shaft 6. A belt 26 is engaged between plates 10 and 14 of the double pulley assembly and extends around a pulley 28 on the input shaft 30 of a gearbox 31 through which the axle 33 of wheel 4 is driven. Shaft 16 of the double pulley assembly is secured to a speed change lever 18 pivotally mounted to the vehicle structure by a pin 20. Generally, the combine engine runs at a substantially constant speed, and the ground speed is controlled by changing the drive ratio between the output of the engine and the drive wheels. Thus, upward and downward movement of lever 18 about the axis of pin 20 vertically shifts the position of the double pulley assembly and causes the inner plate 14 to shift axially relative to plates 10 and 12 and thereby increase or decrease the ground speed of the vehicle. Lever 18 is connected though a link 32 with a ground speed selector 34 mounted adjacent the operator's platform by a pin or shaft 36. The ground speed is determined by the position of the selector 34 which, when pivoted about the axis of shaft 36 transmits rotation to lever 18 about the axis of pin 20.

Reference numeral 38 designates collectively crop handling apparatus for the combine, which, in the illustrated embodiment is in the form of a conventional harvesting reel having a shaft 44 and slats 42. Reel 38 is driven through belts 46 and 48 by a power input member or shaft 40. The input shaft 40 is driven by a belt 50 from a drive shaft 52. Shaft 52 is driven from the main power plant by a belt 54. A variable speed pulley 56 is mounted on the end of the input shaft 40. Pulley 56 has a movable plate or member 57 spring loaded toward the fixed member or plate 59 of the pulley by a spring assembly 58. A variable speed pulley 60 having a movable half 62 is mounted on the end of shaft 52 and is connected with the variable speed pulley 56 by a belt 50. The movable portion 62 of pulley 60 is actuated by a shifter member 64 pivotally mounted on the vehicle structure by a pin 66. Pivotal movement of shifter 64 about pin 66 increases and decreases the driving ratio between shafts 52 and shaft 40.

One end of a cable 68 is connected with shifter member 64, and the other end of the cable is connected with an arm 70 on the ground speed control lever 18. Cable 68 extends around pulleys 78, 80, 76 and 82 between shifter member 64 and arm 70. Pulleys 80 and 82 are mounted on a common shaft 84 supported at a fixed point beneath the operator's platform, and pulley 78 is mounted at a fixed point on the vehicle structure between pulley 80 and shifter member 64. Pulley 76 is mounted on a speed change lever 74 pivotally supported on the side of the operator's platform by a pin 72.

The speed change lever 74 is connected by a link 86 with a lever arm 88 mounted on a shaft or sleeve 90 rotatably supported in a plate 94. Projecting radially from sleeve 90 is a selector member 92 which is pivotally movable about the axis of sleeve 90 relative to an arcuate slot 96 formed in a plate 94. Slot 96 is formed with a plurality of serrations or grooves 98 for a locking member in the form of a spring loded plunger or rod 100 slideably mounted in the selector handle 92. Rod 100 has a tooth or projection 102 projecting therefrom for selective engagement with the notches 98. By pressing the upper end of rod 100 against the spring (not shown), the tooth 102 is moved out of engagement with the grooves 98 permitting the operator to freely pivot selector 92 within the limits of slot 96. When the selector is in the desired position, rod 100 is released and tooth 102 engages the appropriate groove 98. Clockwise movement of selector 92 in the direction of arrow $b$ causes shifter member 64 to pivot the direction of arrow $a$ to decrease the diameter of pulley 60 engaged by belt 50. Conversely, counterclockwise movement of selector 92 produces clockwise movement of shifter member 64 about pin 66 to cause plate 62 to move toward the fixed plate of pulley 60 and increase the effective diameter of pulley 60. The spring assembly 58 causes the effective diameter of pulley 56 to increase and decrease, respectively, in response to decreases and increases in the diameter of pulley 60 on shaft 52.

After the reel speed has been initially determined by the setting of selector 92, the speed of the reel is increased or decreased proportionally in accordance with changes in position of the ground speed control lever 18. Movement of lever 18 in the direction of arrow $c$ (counterclockwise about pin 20) causes shifter member 64 to pivot counterclockwise about pin 66 in the direction of arrow $a$, and vice versa. Thus, shifter member 64 responds to changes in the position of either selector 92 or the ground speed selector 34. The speed of the reel can be changed while the machine is moving by changing the position of the selector 92. Since the reel 38 is driven independently of the drive wheels 4, there is no differential action that effects the speed of the reel during turns. Consequently, the reel speed remains constant during turns. The forward travel of the machine may be stopped by interrupting the drive to shaft 33 through a clutch 104 actuated by a pedal 106. However, the reel will continue to run unless the engine is shut down.

While the invention has been described in connection with the control of a harvesting reel of an agricultural combine, it is obvious that the invention has other adaptations such as for driving the gathering units of a corn harvester, the pick-up reel for a baler, or other material handling apparatus on a self-propelled machine.

After the reel speed has been initially determined by the setting of selector 92, the speed of the reel is increased or decreased proportionally in accordance with changes in the position of the ground speed lever 18. Movement of lever 18 in the direction of arrow $c$ (counterclockwise about pin 20) causes shifter member 64 to pivot clockwise about pin 66, and vice versa. Thus, shifter member 64 responds to changes in the position of either selector 92 or the ground speed selector 34. The speed of the reel can be changed while the machine is moving by changing the position of the selector 92. Since the reel 38 is driven independently of the drive wheels 4, there is no differential action that effects the speed of the reel during turns. Consequently, the reel speed remains constant during turns. The forward travel of the machine may be stopped by interrupting the drive to shaft 33 through a clutch 104 actuated by a pedal 106. However, the reel will continue to run unless the engine is shut down or the threshing mechanism lever is disengaged.

While the invention has been described in connection with the control of a harvesting reel of an agricultural combine, it is obvious that the invention has other adaptations such as for driving the gathering units of a corn harvester, the pick-up reel for the baler, or other material handling apparatus on a self-propelled machine.

We claim:

1. In an agricultural machine having a body supported on ground engaging wheels including at least one drive wheel, a power plant and crop handling apparatus carried by the body, a first variable speed drive between the power plant and drive wheel for driving the drive wheel and second variable speed drive means between the power plant and crop handling apparatus for driving the crop handling apparatus; control means interconnecting said first and second variable speed drive means and operable to vary the second variable speed drive means to change the speed at which the crop handling apparatus is driven by the power plant in response to variation of the first variable speed drive means to change the ground speed.

2. The construction claimed in claim 1 further including means interconnected with said control means for selectively adjusting said second variable speed drive to increase or decrease the speed of the crop handling apparatus independently of the ground speed.

3. The construction claimed in claim 1 wherein said first variable speed drive means has a ground speed control lever selectively movable to change the ground speed such that the driving ratio between the drive wheel and power plant is determined by the position of said ground speed control lever, and said control means is connected with said ground speed control lever such that the second variable speed drive means is varied by changing the position of said ground speed control lever.

4. The construction claimed in claim 3 further including means interconnected with said control means for selectively varying said second variable speed drive means to change the speed of the crop handling apparatus independently of the position of said ground speed control lever.

5. The construction claimed in claim 1 wherein said first variable speed drive includes a ground control lever selectively movable to change the input speed to the drive wheel and said control means includes a cable connected between said ground speed control lever and said second variable speed drive such that said second variable speed drive is varied by said cable to change the input speed from said power plant to the crop handling apparatus when said ground speed control lever is moved.

6. The construction claimed in claim 5 further including a speed change lever connected with said cable intermediate the ends thereof selectively movable to a selected one of a plurality of positions to cause said cable to vary the second variable speed drive to change the speed of the crop handling apparatus independently of the position of the ground speed control lever, and said ground speed control lever being movable independently of the speed change to simultaneously vary said just and second variable speed drives.

7. The construction claimed in claim 1 wherein said crop handling apparatus has an input shaft drivingly connected with the power plant by said second variable speed drive, and said second variable speed drive includes a variable speed pulley, a shifter member movable to increase or decrease the effective diameter of said variable speed pulley, and said first variable speed drive means includes a ground speed control lever movable to change the driving ratio between the drive wheel and power plant to selectively change the ground speed, said control means is connected between said shifter member and said ground speed control lever and changes the position of the shifter member to increase or decrease the speed of the input shaft of the crop handling apparatus in response to changes in the position of the ground speed control lever to respectively increase or decrease the ground speed.

8. The construction claimed in claim 7 further including a speed selector interconnected with said control means for selectively actuating the shifter member to change the speed of said input shaft without affecting the position of the ground speed control lever.

9. The construction claimed in claim 7 wherein said control means comprises a flexible cable connected between said shifter member and ground speed control lever, and further including a speed change lever pivotally mounted on the body, a pulley carried by said speed change lever, and said cable being engaged with said pulley intermediate its ends such that pivotal movement of said speed change lever causes corresponding movement of said shifter member independently of said ground speed control lever such that the cable connection to the ground speed control lever maintains a proportional relationship between the ground speed and the speed of the input shaft of the crop handling apparatus, and the cable connection to said speed change lever permits selective adjustment of said proportional relationship.

10. The construction claimed in claim 1 further including a gearbox, the input of which is connected to be driven by said first variable speed drive and the output of which is connected to drive the drive wheel, means for selectively interrupting the drive between said first variable speed drive and said gearbox to stop the travel of the machine, and wherein said first variable speed drive has a ground speed control lever movable to selectively change the ratio between the power plant and the input of the gearbox to selectively vary the ground speed, said second variable speed drive has a shifter member movable to change the ratio between the power plane and crop handling apparatus to change the speed at which the crop handling apparatus is driven, said control means includes a flexible cable connected between said ground speed control lever and said shifter member such that the position of said shifter member is changed when the position of the ground speed control lever is changed to maintain a proportional relationship between the speed of the crop handling apparatus and the output speed of said first variable speed drive, and further including a speed change lever pivotally supported on the body of the machine and connected with the cable for selectively adjusting the shifter member to change the speed of the crop handling apparatus independently of the position of the ground speed control lever so that the speed of the crop handling apparatus can be selectively changed while the machine is traveling to increase or decrease the speed of the crop handling apparatus relative to the ground speed with the connection between the ground speed control lever and cable thereafter causing the speed of the crop handling apparatus to increase or decrease proportionally with the ground speed and the crop handling apparatus will continue to run at the speed determined by the position of the speed change lever and ground speed control lever when the machine is stopped, traveling forward or reverse, or during turns.

References Cited

UNITED STATES PATENTS

| 3,073,099 | 1/1963 | Andersen | 56—20 |
| 3,093,946 | 6/1963 | Pitt et al. | 56—20 |

ANTONIO F. GUIDA Primary Examiner

PO-1050 (5/69)

UNITED STATES PATENT OFFICE
CERTIFICATE OF CORRECTION

Patent No. 3,466,854      Dated September 16, 1969

Inventor(s) Robert Ashton, Wilbert D. Weber and Walter Hirsch

It is certified that error appears in the above-identified patent and that said Letters Patent are hereby corrected as shown below:

Claim 5, line 2, insert the word --speed-- between "ground" and "control".

Claim 6, line 9, insert the word --lever-- between "change" and "to".

Claim 6, line 9, change the word "just" to --first--.

Claim 7, line 10, insert the word --and-- between "speed," and "said".

Claim 10, line 13, change the word "plane" to --plant--.

SIGNED AND SEALED
MAY 5 1970

(SEAL)
Attest:

Edward M. Fletcher, Jr.
Attesting Officer

WILLIAM E. SCHUYLER, JR.
Commissioner of Patents